(12) United States Patent
Richardson

(10) Patent No.: US 9,603,757 B2
(45) Date of Patent: Mar. 28, 2017

(54) SAFETY SYSTEM FOR USE WITH A GENERATOR OF A VEHICLE WITH A CAB

(71) Applicant: FRAZER, LTD., Houston, TX (US)

(72) Inventor: Thomas A. Richardson, Houston, TX (US)

(73) Assignee: FRAZER, LTD., Houston, TX (US)

( * ) Notice: Subject to any disclaimer, the term of this patent is extended or adjusted under 35 U.S.C. 154(b) by 99 days.

(21) Appl. No.: 14/748,835

(22) Filed: Jun. 24, 2015

(65) Prior Publication Data

US 2016/0374875 A1    Dec. 29, 2016

(51) Int. Cl.
| | |
|---|---|
| *G08B 21/00* | (2006.01) |
| *A61G 3/00* | (2006.01) |
| *B60Q 5/00* | (2006.01) |
| *B60L 11/08* | (2006.01) |
| *H02K 51/00* | (2006.01) |
| *H02J 9/08* | (2006.01) |
| *B60K 25/00* | (2006.01) |

(52) U.S. Cl.
CPC ............. *A61G 3/001* (2013.01); *B60L 11/08* (2013.01); *B60Q 5/001* (2013.01); *B60Q 5/005* (2013.01); *H02J 9/08* (2013.01); *H02K 51/00* (2013.01); *B60K 25/00* (2013.01)

(58) Field of Classification Search
CPC .................................................... A61G 3/001
USPC ..................... 340/425.5, 438, 632, 635, 648; 123/198 D; 180/271; 322/1
See application file for complete search history.

(56) References Cited

U.S. PATENT DOCUMENTS

| | | |
|---|---|---|
| 4,672,296 A | 6/1987 | Griffin |
| 4,785,227 A | 11/1988 | Griffin |
| 5,333,703 A | 8/1994 | James et al. |
| 6,983,726 B1 | 1/2006 | Luo et al. |
| 8,534,258 B2 | 9/2013 | Cristfro |
| 2007/0085692 A1 | 4/2007 | Grant et al. |
| 2012/0130604 A1 | 5/2012 | Kirshon et al. |

*Primary Examiner* — Jeffery Hofsass
(74) *Attorney, Agent, or Firm* — Egbert Law Offices, PLLC

(57) ABSTRACT

A safety system includes a vehicle having a cab and a compartment rearward of the cab, an engine that provides motive power to the vehicle, a generator positioned in the vehicle so as to supply electrical energy to the compartment, an alarm positioned in or on the vehicle so as to be cooperative with the engine and the generator, an alarm acknowledge switch positioned in or on the vehicle, a shore power connection on the vehicle, and a control module positioned in or on the vehicle so as to selectively activate or deactivate the alarm or to deactivate the generator when certain conditions occur. The generator has an on/off switch so as to turn the generator either on or off. The alarm is activated when the generator is turned on and the engine is not running. The alarm acknowledge switch is activatable as to turn the alarm off. The shore power connection is adapted to be connected to a source of electrical energy exterior of the vehicle.

20 Claims, 4 Drawing Sheets

SAFETY SYSTEM FOR USE WITH A GENERATOR OF A VEHICLE WITH A CAB

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to vehicles that have generators mounted therein. More particularly, the present invention relates to safety systems for assuring a proper operation of the generator of the vehicle. More particularly, the present invention relates to safety systems for assuring that the generator is turned off when certain conditions occur.

2. Description of Related Art Including Information Disclosed Under 37 CFR 1.97 and 37 CFR 1.98

Various vehicles have been developed that include generators that are operated independently of the vehicle engine. Typically, these generators will supply an independent source of alternating current so as to operate equipment within the vehicle. It is known that certain trucks, recreational vehicles and emergency medical vehicles include generators. In certain trucks, these generators are utilized so as to maintain a cooling condition within the cab or bed of the truck. In other circumstances, generators are used on recreational vehicles so as to supply power to various appliances located within the recreational vehicle.

Relatively recently, generators have been utilized in association with mobile emergency vehicles. Such mobile emergency vehicles are currently manufactured by Frazer, Ltd. of Houston, Tex. These mobile emergency vehicles are presently the subject of U.S. Pat. No. 4,672,296 (issued on Jun. 9, 1987) and U.S. Pat. No. 4,785,227 (issued on Nov. 15, 1988) to J. Griffin. In particular, each of these mobile emergency vehicles are unique in that it incorporates a generator that is mounted on a skid-type of mounting frame and fitted within the compartment of the mobile emergency vehicle. The emergency medical vehicle is built on a conventional truck chassis and has the main transport engine located beneath the hood in a manner well-known in the art. The patient compartment is mounted on the rearward portion of the truck chassis in a manner that is also known in the prior art. The mobile emergency vehicle of these prior art patents has the vehicle essentially self-supported with regard to its electrical requirements. An auxiliary engine and generator are mounted exteriorly of the patient module such that the exhaust system extends outwardly so as to deliver minimal noise and vibration to the patient module. The electrical output of the generator is preferably capable of providing 4 to 6 kW of continuous electrical power and is capable of continuously delivering 115 volts of AC power to the electrical load center of the patient compartment. The load center provides distribution of the primary output of the generator to air-conditioning and heating. As such, the generator provides the power necessary to supply both cooling and heating to the patient compartment. The generator is preferably located on the passenger side at a rear lower corner of the vehicle. The generator provides power for emergency lights, air conditioning, heating, suction, interior lights, and the like.

Prior to the development of the emergency medical vehicle of Frazer, Ltd., all of the power requirements for ambulances were achieved through the use of an alternator directly connected to the engine. As such, the power to the patient compartment had to be supplied from energy stored in the battery or directly by an alternator. Typically, during procedures, the engine would remain idling so as to continuously supply power. Unfortunately, the power supplied by the alternator is a relatively poor quality of power. There are substantial fluctuations in the power levels provided by such alternators. Additionally, the exhaust from the idling engine would be discharged in the area of the double doors located at the rear of the patient compartment. As such, emergency medical personnel and patients would be exposed to substantial amounts of carbon monoxide when the patient is being placed into the interior of the patient compartment. Under other circumstances, the emergency vehicle would enter a closed area with the engine running. As such, there would always remain the danger of carbon monoxide poisoning during those events in which the engine is maintained in an idling mode for the purposes of supplying power.

Engines, including generators, produce exhaust gases containing carbon monoxide as result of the incomplete combustion of carbon-based fuels. As is well known, carbon monoxide is a very poisonous gas. The presence of carbon monoxide in one's bloodstream reduces the level of oxygen in the blood, which in turn, starves the brain of oxygen. The lethal effect of carbon monoxide poisoning has been known since ancient times. Unfortunately, carbon monoxide is particularly dangerous because it is both colorless, tasteless and odorless. This makes detection of the gas by human senses difficult.

Numerous carbon monoxide poisonings occur each year. Carbon monoxide poisoning results from voluntary or involuntary inhalation of exhaust gases. Many systems are presently available for monitoring levels of carbon monoxide. However, present systems fail to solve several problems associated with detecting hazardous concentrations of carbon monoxide produced by a vehicle. Present carbon monoxide monitoring and detection systems inform the vehicle operator of potentially dangerous levels of carbon monoxide. The systems, however, do not alleviate the problem by disabling the source of the noxious gas. Therefore, the risk of carbon monoxide poisoning continues after detection of the hazardous condition.

Importantly, the disabling of the source of carbon monoxide upon detection of a hazardous concentration of the gas may often cause false disablements. Often, the concentration of carbon monoxide is hazardous at a specific but short time and the carbon monoxide quickly dissipates. In these situations, disabling the source is unnecessary to the safety of the vehicle's operators and passengers and is a nuisance to the vehicle operator.

Disabling a vehicle's engine or generator upon detection of a hazardous level of carbon monoxide is also dangerous. This is particularly true in the case of emergency medical vehicles. The emergency medical vehicles are required to transport a patient in a quick and efficient manner. If the vehicle is disabled for any period of time, then this can be hazardous to the well-being of the patient.

Alarms are available that provide visual and audio information when carbon monoxide levels reach an undesirable level. However, vehicle operators may be tempted to disable the alarm in order to avoid the annoying sound. Whenever the alarm is disabled, a very dangerous condition can occur. Other vehicle operators may not know of the disabled alarm.

In those cases where the emergency medical vehicle utilizes a generator to power the patient compartment, it will be undesirable to use the quiet generator when the engine of the vehicle is not running Under the circumstances, the generator will produce carbon monoxide. This carbon monoxide gas will be discharged at the rear of the vehicle. This is the area in which the patient-loading activities will occur. As such, exposure to the carbon monoxide gas can occur in such areas. Additionally, the operators of the emergency medical vehicle may be unaware of the operation of the generator because the generator is so quiet carbon monoxide exposure could occur inadvertently. However, under certain circumstances, it is desirable to run the generator while the engine is off. For example, operators of emergency medical vehicles at a sporting event may wish to use the generator to power heating or air-conditioning while the engine is turned off. As such, it is desireable to allow the operators the opportunity to use the generator while the engine is off.

Whenever the emergency medical vehicle is at a station, it will be connected to a shore line at the station. The shore line will provide AC power to the vehicle. As such, there would never be a need to use the carbon monoxide-producing generator while at the station. As such, a need has developed whereby a system can be developed that effectively prevents carbon monoxide poisoning and which controls the operation of the generator in order to prevent such poisoning.

In the past, various patents have issued relating to control systems for generators which serve to control the operation of the generator in response to carbon monoxide levels. For example, U.S. Pat. No. 5,333,703, issued on Aug. 2, 1994 to James et al., describes a carbon monoxide sensor and control for motor vehicles. The system monitors carbon monoxide levels produced by the operation of the engine of a vehicle. The system includes a detector in the vehicle's passenger compartment for detecting the concentration of carbon monoxide within the compartment and circuitry for generating a high carbon monoxide signal when the detected concentration of carbon monoxide inside the compartment is greater than a predetermined level. The system disables the operation of the engine in response to the high carbon monoxide system. The system also senses a status condition of the vehicle and inhibits the disabling of the engine when the status condition is sensed.

U.S. Pat. No. 6,983,726, issued on Jan. 10, 2006 to Luo et al., describes a method for monitoring and mitigating exhaust gas emitted from a vehicle. A remote monitoring device within a closed structure is trained in response to a training signal transmitted from a remote transmitter device. A remote engine start signal is intercepted within a receiving circuit of the remote monitoring device during an actual remote engine start operation. The exhaust gas emitted from the vehicle is monitored in response to receiving the remote engine start signal. A determination is made if an exhaust gas concentration level is greater than a predetermined threshold. A control signal is transmitted to a mitigation device for mitigating the exhaust gas within the closed structure when the exhaust gas concentration is greater than the predetermined level.

U.S. Pat. No. 8,534,258, issued on Sep. 17, 2013 to M. Cristfro, describes a carbon generator and carbon monoxide detector. The generator includes an internal combustion engine coupled to the generator. The internal combustion engine produces exhaust gases when operating. The system includes a gas detector positioned in an enclosure into which exhaust gas may flow. The detector is coupled to a signal transmitter that is operable to send a signal of a predetermined level when a selected gas or compound is sensed. The signal is received by an engine shutdown device that is operable to shut down engine operation after the signal is received.

United States Patent Publication No. 2007/085692, published on Apr. 19, 2007 to Grant et al., teaches a carbon monoxide detector on a gas-powered generator. The carbon monoxide detector is coupled to the generator. The detector is configured to provide notification when a predetermined concentration of carbon monoxide is reached. The detector is configured so as to disable the generator.

U.S. Patent Publication No. 2012/0130604, published on May 24, 2012 to Kirshon et al., provides an automatic shutdown system for automobiles. A vehicle status monitor and control system monitors a series of sensors installed within a vehicle to monitor specific functions to determine if a vehicle engine is running and there is a potential for toxic exhaust gases to accumulate so as to create a toxic environment. The vehicle status monitor and control system determines if the vehicle is running and stationary over a period of time. The system additionally monitors the presence of a driver. If the predetermined conditions are met, the system terminates the operation of the vehicle's engine. The system can optionally include an override feature to ensure the engine continues running when desired.

It is an object of the present invention to provide a safety system that reduces the risk of carbon monoxide poisoning.

It is another object of the present invention to provide a safety system that assures that the generator will not start under certain conditions.

It is another object of the present invention to provide a safety system that assures that the operator must acknowledge certain circumstances when the generator is running.

It is another object of the present invention to provide a safety system that avoids dangerous situations.

It is still another object of the present invention provide a safety system that requires the operator to be proactive when unsafe conditions are recognized.

It is a further object of the present invention provide a safety system that minimizes the ability to damage or tamper with the alarm equipment.

It is still a further object of the present invention to provide a safety system that enhances safety.

These and other objects and advantages of the present invention will become apparent from a reading of the attached specification and appended claims.

BRIEF SUMMARY OF THE INVENTION

The present invention is a safety system that comprises a vehicle having a cab and a compartment rearward of the cab and an engine that provides motive power to the vehicle, a generator positioned in the vehicle so as to supply electrical energy to the compartment, and alarm positioned in or on the vehicle and cooperative with the engine and generator, and an alarm acknowledge switch positioned in or on the vehicle, a shore power connection on the vehicle, and a control module positioned in or on the vehicle so as to selectively activate or deactivate the alarm when certain conditions occur. The generator has an on/off switch so as to turn the generator either on or off. The alarm is activated when the generator is turned on and the engine is not running. The alarm has a power line extending thereto. The alarm acknowledge switch is activated also as to turn the alarm off. The shore power connection is adapted to be connected to a source of electrical energy exterior of the vehicle.

The control module is cooperative with the alarm so as to activate the alarm when the engine is not running and the generator is on. The control module is also cooperative at the generator to turn the generator off when the source of electrical energy exterior of the vehicle is connected to the shore power connection. The control module is also cooperative with the generator so as to turn the generator off when the power line to the alarm is severed or detached from the alarm. A timer is cooperative between the control module and the alarm such that control module activates the timer when the generator is on and the engine is not running. The control module turns off the generator after the timer has measured out a period of time if the alarm has not been acknowledged by activating the alarm acknowledge switch.

The generator is positioned adjacent at a rear of the vehicle. The alarm acknowledge switch is positioned away from the cab. In particular, the alarm acknowledge switch is positioned adjacent to the generator and positioned in the compartment. The alarm is positioned in the cab of the vehicle.

In the present invention, the vehicle is an emergency medical vehicle. The compartment is a patient compartment. The patient compartment has a double door at a rear thereof. The alarm acknowledge switch is positioned in the patient compartment adjacent to the double doors.

This foregoing section is intended describe, with particularity, the preferred embodiment of the present invention. It is understood that modifications to this preferred embodiment can be made within the scope of the present invention. As such, this Section should not be construed, in any way, as limiting of the broad scope of the present invention. The present invention should only be limited by the following claims and their legal equivalents.

DETAILED DESCRIPTION OF THE INVENTION

Figure 1:
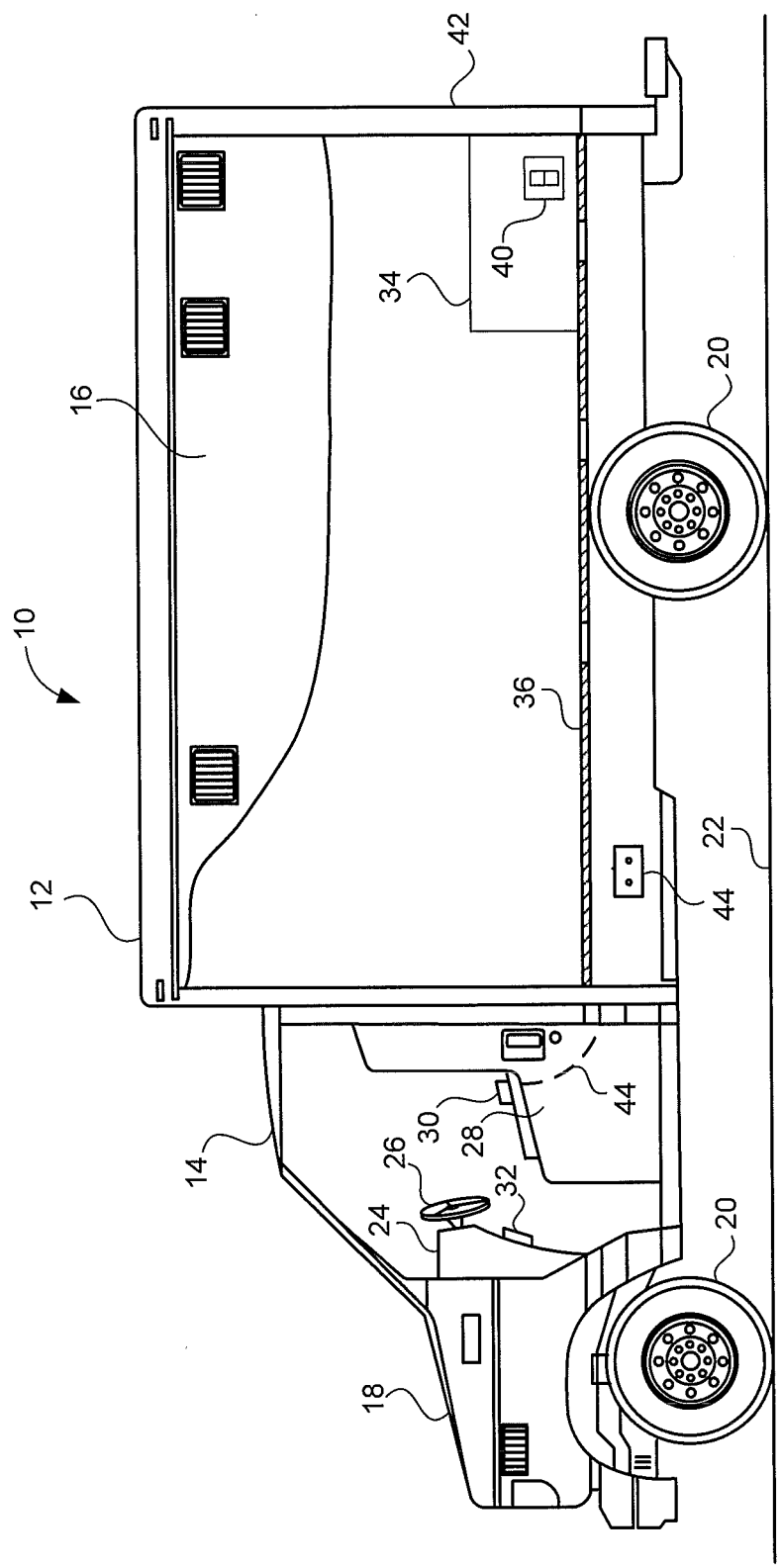
FIG. 1 is a side elevational view in partial cross-section of the emergency medical vehicle having the safety system of the present invention therein.

Referring to FIG. 1, there is shown the safety system 10 in accordance with the present invention. The safety system 10 includes a vehicle 12 having a cab 14 and a compartment 16 positioned rearwardly of the cab. The vehicle 12 has an engine 18 positioned forwardly of the cab 14. The engine will provide motive power to the vehicle. In FIG. 1, the vehicle 12 is an emergency medical vehicle, in the nature of an ambulance. As such, the vehicle 12 will include wheels 20 that are driven by the engine 18 so as to allow the vehicle 12 to move along an underlying surface 22, such as a road.

The cab 14 is in the nature of a conventional cab of an emergency medical vehicle. In particular, the interior of the cab 14 is illustrated with the door removed therefrom. The cab 14 includes a dashboard 24 and a steering wheel 26. The operator of the vehicle 12 can sit on the seat 28. Importantly, an alarm 30 is positioned within the cab 14. The alarm 30 can be in the nature of an audio and/or video alarm. The alarm 30 is configured so as to notify the driver or operator of the vehicle 12 of a dangerous condition. The cab 14 also includes a generator on/off switch 32 positioned on the dashboard 24. The on/off switch 32 can also be placed in any other convenient location within the cab 14. The on/off switch allows the operator of the vehicle 12 to selectively activate the generator 34 located rearwardly of the compartment 16 the vehicle 12.

The compartment 16 is in the nature of a patient compartment used in an emergency medical vehicle. In particular, there is a floor 36 that extends across the bottom of the compartment 16 and supported above the wheels 20. The floor 36 is suitable for receiving personnel therein, gurneys, emergency equipment, and supplies. The generator 34 is illustrated as located above the floor 36. In typical practice, as shown in the prior patents described hereinbefore of Frazer, Ltd., the generator 34 is provided within the interior of a housing located in the compartment 16. The generator 34 will vent to the exterior of the vehicle 12 so that any noxious gases emitted from the generator will not enter the compartment 16.

An alarm acknowledge switch 40 is illustrated as positioned adjacent the rear of the compartment 16 generally adjacent to the double doors 42 located at the back of the vehicle 12. The double doors 42 will be in the nature of conventional double doors used in emergency medical vehicles, such as those described hereinbefore in association with the earlier patents of Frazer, Ltd. The alarm acknowledge switch can be activatable so as to turn the alarm 30 to an off condition.

Within the concept of the present invention, whenever a condition of concern should occur, the alarm 30 will sound. In the past, operators of vehicles would take steps to turn off the annoying alarm. In certain circumstances, operators of vehicles may also potentially cut the line 44 that provides power to the alarm 30. It is recognized that, under certain circumstances, these conditions of concern (to be described hereinafter) could occur, but the operator of the vehicle would use his or her judgment that hazardous conditions will not adversely affect the operation of the vehicle 10 or the ability to treat a patient within the compartment 16. As such, the operator of the vehicle may desire to turn off the alarm for the moment. The operator would then activate the alarm acknowledge switch 40 so as to turn the alarm off.

It is important within the concept of the present invention that the alarm acknowledge switch 40 is located near the double doors at the rear of the vehicle 12 and adjacent to the generator 34. It is important to note that generators can operate very quietly. When the alarm 30 would sound, the operator of the vehicle 12 would actually have to leave the cab 14 and walk to the back of the vehicle 12, open the double doors 42, reach down and activate to the alarm acknowledge switch 40. In particular, the double doors are configured such that one door must be opened before the other door is opened. The alarm acknowledge switch 40 is actually located adjacent to the last door to be opened. The alarm acknowledge switch is also positioned adjacent to the generator 34. As such, the operator will be able to hear that the generator is running when the operator approaches the alarm acknowledge switch 40. As such, it is not a trivial procedure for the operator of the vehicle 12 to turn off the alarm. The operator of the vehicle will have to positively acknowledge the alarm and take positive and thoughtful actions in order to effectively turn off the alarm.

As will be described hereinafter, the alarms 30 is cooperative with the engine 18 and the generator 34. The alarms 30 is activated when the generator 34 is turned on and the engine 18 is not running. The safety system 10 of the present invention also operates so as to turn the generator 34 off when the power line 44 to the alarm 30 is severed or detached from the alarm. A timer can be cooperative with the alarm such that the timer is activated when the generator 34 is on and the engine 18 is not running. The timer will measure a predetermined period of time until the control module turns off the generator if the alarm acknowledge switch 40 is activated, then the generator will continue to operate without the alarm sounding. As such, under certain circumstances when the operator makes a decision that the alarm should not be sounding, or if it is proper for the hazardous condition to occur, the operator can deactivate the alarm by operating the acknowledge switch 40. However, in the event that the operator does not activate the alarm acknowledge switch 40, the timer will operate so as to deactivate the generator 34 after a predetermined period of time (e.g. one minute). When conditions exist that are no longer deemed hazardous, the control module 74 resets such that the next time the generator 34 is turned on and the engine 18 is not running, the alarm is reactivated. The generator of the vehicle will then have to carry out similar procedures to deactivate the alarm 30 once again.

In FIG. 1, it can be seen that there is a shore line connection 44 on the vehicle 12. The shore line connection 44 is adapted be connected to a source of electrical energy exterior of the vehicle 12. Under normal circumstances, where the vehicle 12 is an emergency medical vehicle, the vehicle 12 will be stored between runs at a station. Whenever the vehicle 12 is in a station, the engine 18 is turned off, the generator 34 is turned off, and all power to the vehicle 12 is achieved by the connection between the shore line connection 44 and a source of electrical energy exterior of the vehicle 12. The source of electrical energy exterior of the vehicle can be a cord and/or plug located with a conventional utility power supply at the station. As a result, any and all power to the emergency medical vehicle is supplied by way of utility power. This avoids any potentially noxious fumes from being emitted while the vehicle is at the station.

In the safety system 10 of the present invention, the generator 34 is automatically turned off as long as the shore line connection is connected to the power supply at the station. As a result, there is no possibility that the generator 34 will continue to emit carbon monoxide in the enclosed environment of the station. If it is desired, for any reason, to work on the generator and to temporarily start the generator for the purposes of repair or maintenance, then the shore line connection can be separated from the utility power supply at the station. As a result, the generator 34 will then be available for proper temporary operation.

Figure 2A:
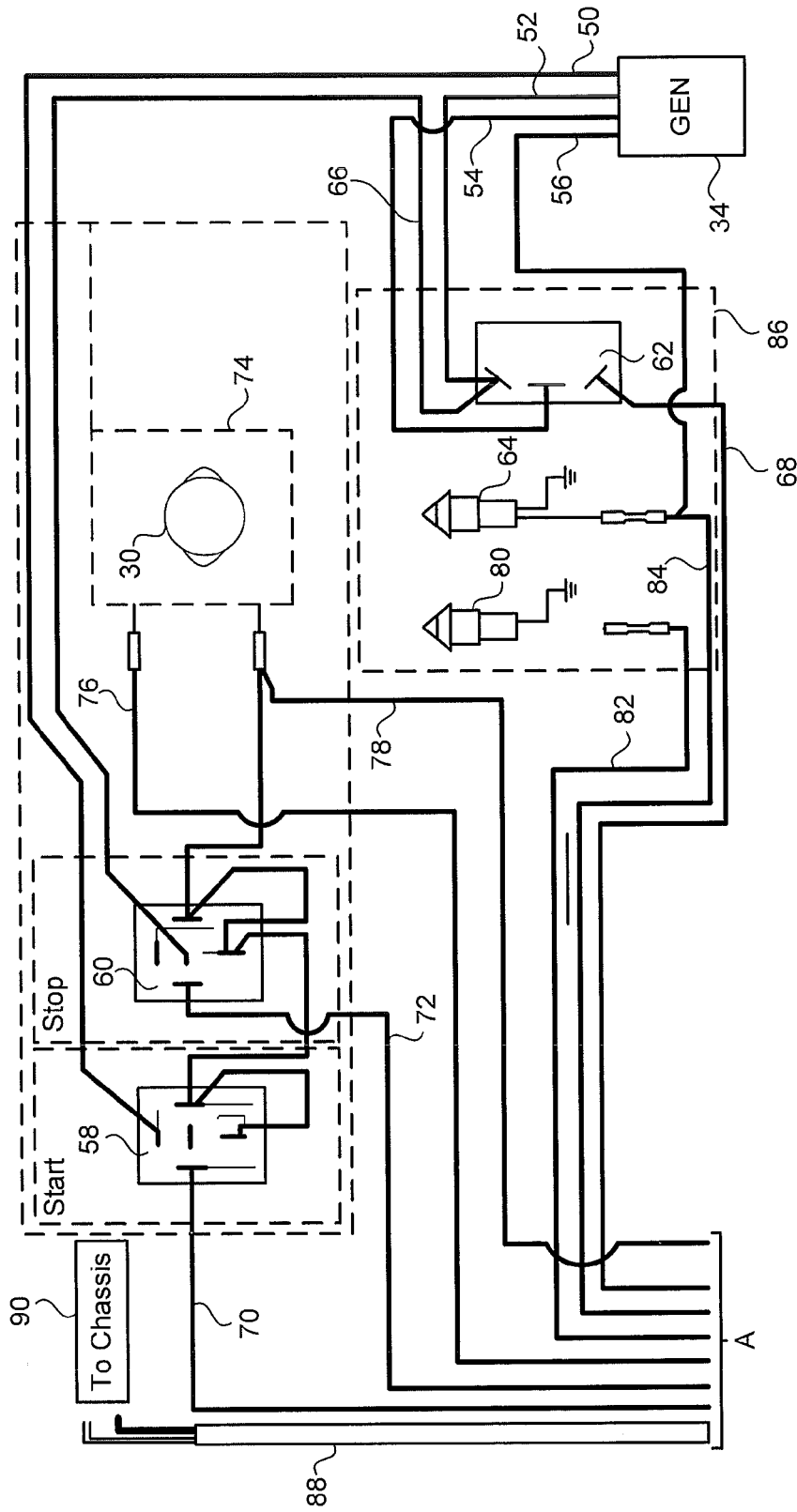
FIGS. 2A and 2B are schematic illustrations of the electronics associated with the safety system of the present invention.

FIG. 2A shows a portion of the electrical schematic associated with the safety system 10 of the present invention. In particular, in FIG. 2A, it can be seen that the generator 34 has lines 50, 52, 54 and 56 extending therefrom. Line 50 extends so as to be joined to a start relay 58. Line 52 extends from generator 34 so as to be connected to the generator on/off switch 62. Line 54 extends so as to be connected to the generator on/off switch 62. Line 56 extends to a run illumination LED 64. The run illumination LED 64 can be located within the cab 14 so as to provide an indication to the operator of the vehicle 12 that the generator is on. The generator on/off switch can be suitably manipulated in the nature of a conventional on/off switch such that the movement of the switch from one position or another will cause the generator 34 to operate and to cause the generator 34 to stop.

Line 66 from the on/off switch 62 extends so as to be connected to the stop relay 60. Line 84 extends from the run illumination LED so as to be ultimately connected to the control module. As such, line 84 will provide an input to the control module (to be described hereinafter) of the condition of the generator.

The start relay 58 includes a line 70 that also extends to the control module. As such, the control module can send a signal to the start relay 58 to start the generator 34. The stop relay 60 also includes a line 72 that extends to the control module. As a result, the control module can send a signal to the stop relay 60 to stop the operation of the generator 34. The alarm 30 is illustrated in a module 74. Module 74 has one line 78 that extends so as to be connected to ground. Line 76 extends so as to be connected to the control module. Line 76 allows the control module to send a suitable signal so as to activate the alarm module 74. The alarm 30 is illustrated as being a buzzer type of alarm or a whoop tone alarm that operates off of the power of the battery of the vehicle 12. A variety of other types of buzzers or alarms can be utilized in association with the present invention.

An LED 80 is illustrated as connected the line 82 that extends to the control module. LED 80 is a red blinking LED that is indicative of exhaust. LED 64 is also connected by a line 84 to the control module. LED 64 is a green LED that is indicative of a running condition. The generator on/off switch 62 and the LEDs 64 and 68 are illustrated as located in a console the module 86. Line 88 is connected to the chassis 90 of the vehicle 12 and also extends to the control module.

Figure 2B:
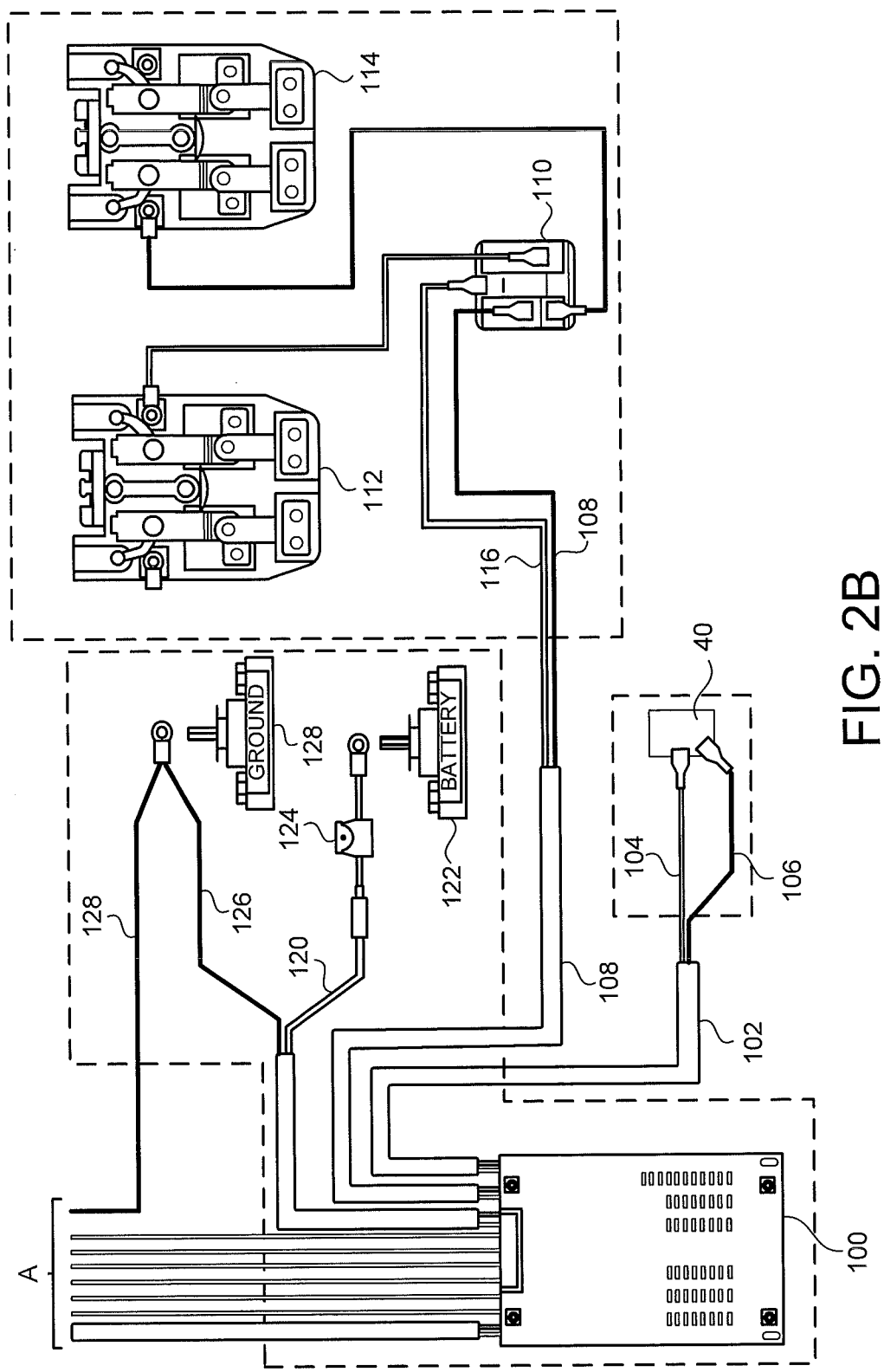

FIG. 2B shows a continuation of the schematic of FIG. 2A. In particular, the control module 100 is illustrated. Control module 100 is connected to the various lines extending from FIG. 2A. The control module 100 is a twelve input, eight output, 2CAN port, with a configurable input/output. The control module 100 will include the logic associated with the flow diagram of FIG. 3 herein.

A line 102 extends from the control module 100 to the alarm acknowledge switch 40. The alarm acknowledge switch 40 includes a pair of terminals that are representative of the on/off condition of the alarm acknowledge switch 40. The alarm acknowledge kill switch 40 is a momentary switch. As such, separate lines 104 and 106 extend so as to provide an input to the control module 100 of the activation or non-activation of the alarm acknowledge switch 40. Line 108 also extends from the control module 100 so as to be connected to a relay 110 associated with the shore power relays 112 and 114 located in the breaker box. As such, when the shore power relay indicates that shore power is being received by the vehicle 12, a signal can be transmitted along the lines 116 and 118. This will allow the control module to send the signal to deactivate the generator. Line 120 extends from the control module 100 so as to be connected to the battery 122 of the vehicle 12. A suitable fuse 124 is located along line 120. Additionally, line 126 extends from the control module 100 so as to be connected to ground 128.

Ground 128 can also be connected along line 128 and line 78 (as seen in FIG. 2A) to ground the alarm 74.

Figure 3:
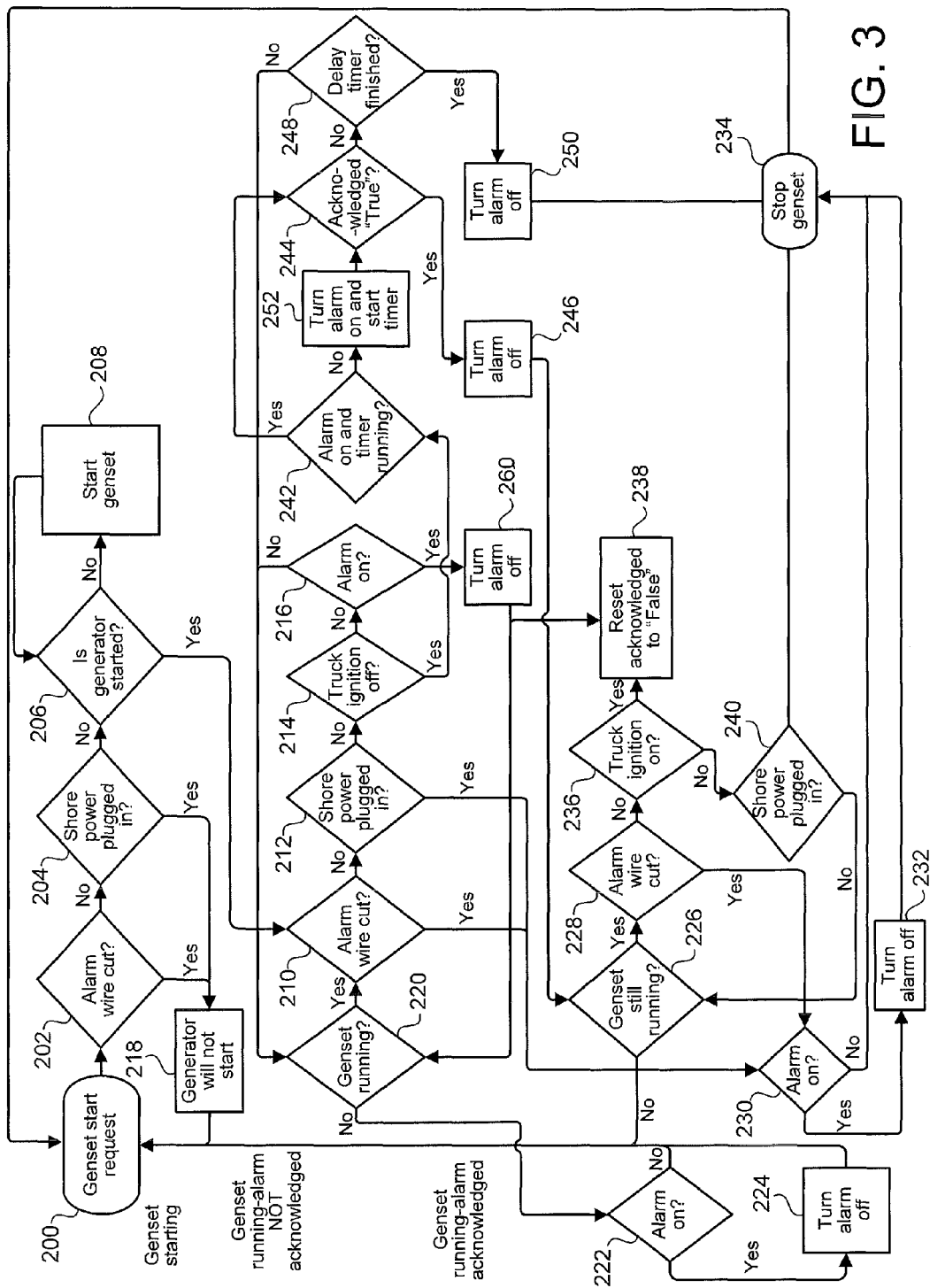
FIG. 3 is a flow diagram of the logic used in the control module of the safety system of the present invention.

FIG. 3 is an illustration of a flow diagram associated with the logic that is associated with the control module 100. Initially, starting with block 200, a generator start request occurs. This can occur as a result of the operator pressing the generator start button 32. The safety system will query in block 202 as to whether the alarm wire is cut. If the alarm wire has not been cut, then the system will enter a query 204 as to whether the shore power is plugged in. If the shore power is not connected to the shore power connection 44, then the system will query if the generator has already started in block 206. If the generator 34 has not been started, then a signal will be transmitted so as to start the generator 34 as identified in block 208. The block 208 will inform the query 206 that the generator has started. As a result, the block 206 can then positively process to block 210 to again query whether the alarm wire 44 has been cut. If the alarm wire has not been cut, then query 212 will be whether the shore power connection is achieved with the shore power connector 44. If the shore power is not connected, then the query 214 will be whether the ignition of the vehicle 12 is off. If the ignition is on, then the system will query in block 216 as to whether the alarm is on. If the alarm is not on, then the system will process back to block 220 so as to continue to cycle around. Block 220 inquires as to whether the generator 34 is running. It will then process along blocks 210, 212, 214 and 216 as long as these conditions remain negative.

If a positive answer is given to the query of block 202 that the alarm wire is cut, then the control module 100 will transmit a proper signal to the relay to stop and to turn off the generator. When the alarm wire 44 is cut, then the system will keep the generator from ever starting until the alarm wire is properly repaired. As result, this provides a positive feedback to a later operator of the vehicle that damage to the alarm wire has occurred and that it needs to be repaired. Whenever the generator will not start upon command, this will provide an immediate impression to the operator of the vehicle so that this problem can be immediately remedied.

Similarly, when shore power connection 44 is receiving power at the station, then a signal will be transmitted from block 204 to turn off the generator and to keep the generator from starting. This assures that the generator will never operate under any circumstances in which the shore power is connected. This avoids those circumstances in which the generator is temporarily operating at the same time that the shore power is being received. This avoids the release of potentially hazardous fumes and also avoids any waste associated with operating two power supplies at the same time.

If the generator 34 is not running, then a query will be made from block 220 to block 222. Block 222 queries whether the alarm is on. If the alarm is on, then a signal will be sent to turn the alarm off as shown in block 224. If the alarm is not on, then the logic will flow back to the generator start request block 220. Additionally, the block 226 will have a query as to whether the generator 34 is still running. If the generator is still running, then the system will query in block 228 as to whether the alarm wire 44 has been cut. If the alarm wire has been cut, then block 230 will query whether the alarm is on. If the alarm is on, then block 232 indicates to turn the alarm off. If the alarm is not on, then a signal will be sent so as to stop the generator 44 as shown in block 234.

If the response to the inquiry of block 228 is negative that the alarm wire is not cut, then the system will query in block 236 as to whether the ignition is on. If the truck ignition is on, then the reset is acknowledged as "false" in block 238. If the truck ignition is not on as a response to the query of block 236, then block 240 will query as to whether the shore power is connected to shore power connection 44. If the shore power is not connected, then the system will process back through block 226 and onward. If the shore power is plugged in, then the generator 34 is stopped as shown in block 234.

Under those circumstances where the generator 34 is running and the alarm is not acknowledged, then block 214 will query whether the ignition is off. If the ignition is off, then block 242 will query whether the alarm is on and the timer is running. The timer, as described hereinbefore, can be integrated into the control module 100. If the alarm is on and the timer is running, then block 244 will query that the acknowledgment is "true". If the acknowledgment is "true" then the alarm is turned off as shown in block 246. If the acknowledgment is not true, then the system will inquire in block 248 whether the delay timer is finished. If the delay timer is finished, then the alarm is turned off in block 250 and the generator 34 is stopped as shown in block 234. If the delay timer is not finished, then the system will process back along the line beginning with block 218. If the query as to whether the alarm is on and the timer is running of block 242 is negative, then block 252 will pass to query 244 is to acknowledge "true".

Under those circumstances where the generator is running and the alarm is not acknowledged, if the alarm wire is cut as a result of the query 210, then the system will process to block 230 as to whether the alarm is on and then the generator 34 will be stopped. If the answer to the query that the shore power is plugged in is positive, then the generator 34 will also stop. When the generator is running and the alarm is not acknowledged, if all of the prior conditions are answered negatively, then a signal will be passed to block 260 to turn the alarm off.

Fundamentally, the processing evidenced by the logic of FIG. 3 assures three primary conditions. First, the generator 44 will never operate when the vehicle 12 is connected to the shore power. Additionally, the generator 44 will never operate when the wire to the alarm is cut. Additionally, the alarm will sound whenever the engine 18 is not running and the generator 44 is running Whenever the generator is operating and the engine is not running, there is a potentially hazardous situation. However, this potentially hazardous situation may be not significant enough to actually shut down the generator. As a result, the alarm will sound so as to cause the operator to positively acknowledge that it is desired to keep the generator running when the engine is not running. If the alarm sounds and the operator recognizes that the running of the generator is not necessary, then the operator can take the necessary steps so as to turn off either the generator. In other circumstances, if it is desired to keep the generator running when the engine is not running, then if the operator desires to remove the annoying sound produced by the alarm, then the operator is required to actually exit the cab of the vehicle, travel to the rear of the vehicle, and open both of the double doors of the vehicle in order to access the alarm acknowledge switch.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

I claim:

1. A safety system comprising:
a vehicle having a cab and a compartment rearward of the cab, the vehicle having an engine that provides motive power to the vehicle;
a generator positioned in said vehicle, said generator supplying electrical energy to said compartment, said generator having an on/off switch so as to turn the generator either on or off;
an alarm positioned in or on said vehicle, said alarm cooperative with said engine and said generator, said alarm activated when said generator is turned on and said engine is not running, said alarm having a power line extending thereto;
an alarm acknowledge switch positioned in or on said vehicle, said alarm acknowledge switch activatable so as to turn said alarm off;
a shore power connection on said vehicle, said shore power connection adapted to be connected to a source of electrical energy exterior of the vehicle; and
a control module positioned in or on said vehicle so as to selectively activate or deactivate said alarm or to selective deactivate said generator when certain conditions occur.

2. The safety system of claim 1, said control module cooperative with said alarm so as to activate said alarm when said engine is not running and said generator is on.

3. The safety system of claim 1, said control module cooperative with said generator so as to turn said generator off when the source of electrical energy exterior of the vehicle is connected to said shore power connection.

4. The safety system of claim 1, said control module cooperative with said generator so as to turn said generator off when said power line to said alarm is severed or detached from said alarm.

5. The safety system of claim 2, further comprising:
a timer cooperative between said control module and said alarm such that said control module activates said timer when said generator is on and the engine is not running, said control module stopping said generator after said timer has measured out a period of time.

6. The safety system of claim 1, said generator positioned adjacent a rear of said vehicle.

7. The safety system of claim 1, said alarm acknowledge switch positioned away from said cab.

8. The safety system of claim 6, said alarm acknowledge switch positioned adjacent to said generator and positioned in said compartment.

9. The safety system of claim 1, said alarm positioned in said cab of said vehicle.

10. The safety system of claim 1, said vehicle being an emergency medical vehicle, said compartment being a patient compartment, said patient compartment having double doors at a rear thereof.

11. The safety system of claim 10, said alarm acknowledge switch positioned in said patient compartment adjacent to said double doors.

12. A safety system for use with a vehicle, the vehicle having a cabin and a compartment rearward of the cab, the vehicle having an engine that provides motive power to the vehicle and a generator that provides electrical energy to the compartment, the vehicle having a shore power connection, the safety system comprising:
an alarm adapted to be cooperative with the engine and the generator, said alarm adapted to be activated when the generator is turned on and the engine is not running, the alarm having a power line extending thereto;
an alarm acknowledge switch cooperative with said alarm, said alarm acknowledge switch being activatable so as to turn said alarm off; and
a control module connected to said alarm and to said alarm acknowledge switch so as to selectively activate or deactivate said alarm or to selectively deactivate the generator when certain conditions occur.

13. The safety system of claim 12, said control module cooperative with said alarm so as to activate said alarm when the engine is not running and the generator is on.

14. The safety system of claim 12, said control module cooperative with the generator so as to turn the generator off when a source of electrical energy exterior of the vehicle is connected to the shore power connection.

15. The safety system of claim 12, said control module cooperative with the generator so as to turn the generator off when said power line to said alarm is severed or detached from said alarm.

16. The safety system of claim 13, further comprising:
a timer cooperative between said control module and said alarm such that said control module activates said timer when the generator is on and the engine is not running, said control module turning said generator off after said timer has measured out a period of time.

17. A safety system comprising:
an emergency medical vehicle having a cab and a patient compartment, said patient compartment having double doors at a rear thereof, said emergency medical vehicle having an engine that provides motive power to said emergency medical vehicle;
a generator positioned adjacent a rear of said emergency medical vehicle, said generator supplying electrical energy to said patient compartment independently of said engine;
an alarm positioned in said emergency medical vehicle, said alarm cooperative with said engine and said generator, said alarm activated when said generator is turned on and said engine is not running, said alarm having a power line extending thereto;
an alarm acknowledge switch positioned in said patient compartment, said alarm acknowledge switch activatable so as to turn off said alarm;
a shore power connection on said emergency medical vehicle, said shore power connection adapted be connected to a source of electrical energy exterior of said emergency medical vehicle; and
a control module connected to said alarm and to said alarm acknowledge switch so as to selectively activate or deactivate said alarm or to selectively deactivate the generator when certain conditions occur.

18. The safety system of claim 17, said alarm acknowledge switch positioned adjacent to said generator.

19. The safety system of claim 17, said alarm acknowledge switch positioned adjacent to said double doors of said patient compartment.

20. The safety system of claim 17, further comprising:
a timer cooperative between said control module and said alarm such that said control module activates said timer when said generator is one and said engine is not running, said control module turning said generator off after said timer has measured out a period of time.

* * * * *